United States Patent Office 3,382,924
Patented May 14, 1968

3,382,924
TREATMENT OF EARTHEN FORMATIONS COMPRISING ARGILLACEOUS MATERIAL
Carl D. Veley and Albert W. Coulter, Jr., Tulsa, Okla., assignors to The Dow Chemical Company, Midland, Mich., a corporation of Delaware
No Drawing. Filed Sept. 6, 1966, Ser. No. 577,186
13 Claims. (Cl. 166—42)

This invention concerns the treatment of earthen formations in situ, consisting at least in part, of argillaceous material, of which clay and shale are the most common.

The invention is useful in treating terranean formations, including those exposed at the surface, e.g. roadbeds, hillsides and the like, and underground formations including both those just below or near the surface in which formations, footings, or walls of structures rest, and those associated with procurement of valuable fluid minerals, e.g., oil, gas, or brine, or a fluidizable mineral such as salt.

Argillaceous material such as clay or shale undergoes a change when contacted by water and to a lesser but yet to a pronounced extent when contacted by most brines commonly found in subterranean formations, e.g. NaCl brine. Such contact causes the interstitial connecting spaces of the argillaceous material to become choked or plugged, thereby greatly lessening the permeability of the clay or shale to the passage of fluids therethrough.

When footings or foundations of buildings rest in argillaceous earth, damage or at least great inconvenience often stems from the inability of the earth to carry away water due to the impermeable nature of such earth when wet.

In producing fluids from the earth via a wellbore penetrating it, it is manifest that a condition wherein a producing formation suffers extensive decrement to its permeability, is intolerable if a reservoir fluid is to be flowed to the wellbore and be brought up to the earth's surface for industrial or domestic use.

Argillaceous material in top soils and subsoils which are relatively near the surface, wherein troublesome problems arise, may be illustrated by clay roadbeds wherein drain water sometimes accumulates over protracted periods of time and results in softening of the roadbed; wherein waste water such as exists in the case of septic tanks and the like cannot be dissipated due to the clay content of the surrounding ground; wherein underground water flowing through a permeable stratum between relatively impermeable clay or shale strata is trapped against a foundation wall where, due to the impermeable nature of the earthen material above and below the water, the water builds up a high pressure against the wall often resulting in seepage through the wall and sometimes in damage thereto.

Argillaceous material in subterranean strata is often contacted by water or brine. Such contact is frequently encouraged or increased because natural forces therein have been disturbed. Although hydrocarbonaceous fluids are usually found in limestone or sandstone, argillaceous striations therein are fairly common or argillaceous strata lie in the path of the fluid sought to be produced. Acts of drilling and producing oil, gas or the like, or the direct introduction of water or brine through treatments of a fluid-bearing formation, e.g., acidizing, fracturing, or fluid mining (any one of which may comprise injecting water or an aqueous solution down the wellbore and forcing it back into the formation) often increase permeability problems in clay or shale. The resulting formation damage when clay or shale is contacted by water or an aqueous solution of such salts as NaCl, is sometimes so bad that fluid flow to the wellbore is substantially stopped.

Problems associated with clay or shale plugging by water or brine contact have long been recognized but have never been satisfactorily solved.

Efforts have been made to solve the problem including attempts to condition the argillaceous earth with an aqueous solution of $CaCl_2$, $KCl$, $MgCl_2$ or of certain organic compounds. The use of these materials, however, has resulted at best in only temporary benefit, the clay or shale soon after treatment reverting to its original condition.

There is a need accordingly for a more effective and permanent way of lessening permeability damage to earthen formations as a result of their being contacted by water or by certain aqueous salt solutions.

The invention melts this need by providing a method of treating clay or shale-containing terranean formations which include both those near or at the surface and those which are deeply underground such as are penetrated by a wellbore for the production of fluid minerals. The method, broadly, consists essentially of contacting the clay or shale in an earthen formation with an aqueous or polar organic solution of an inorganic salt, said salt being such that it forms a hydrated or hydrous oxide rather than an hydroxide. In general the salts to employ are those of a metal or combination of metals which are capable of precipitating the hydrous oxide of the cation or metal when a solution thereof is admixed with an aqueous solution of an alkali metal hydroxide and which so precipitated hydrous oxide, when subsequently water-washed and dispersed in distilled water, yields a pH value of less than 7, i.e., is at least slightly acidic. The metals whose salts are useful in the practice of the invention are well described in U.S. Patent 3,180,741 to Wainer et al. Identification of such metals is set out therein in column 1, lines 38 and 52 and in column 2, lines 11 to 24. Salts, soluble in water or in an organic solvent, e.g., a water-miscible alcohol, which are illustrative of those useful in the practice of the invention, are the halides, oxyhalides, sulfates, sulfites, acid sulfates and acid sulfites, nitrate, nitrites, phosphates, phosphites, acid phosphates and acid phosphites, acetates, haloacetates, citrates, and formates of Al, Co, Cr, Cu, Fe, Ga, Hf, Hg, In, La, Ni, Pb, Sc, Sn, Th, Ti, Tl, Y, Zn, and Zr. In general, the useful salts in the invention are those of which the cation is a metal selected from the class consisting of Group III–B (viz. Sc, and Y) and the lanthanides; a metal of Group III–A except Boron (viz. Al, Ga, In, and Tl); a metal of Group IV–A (e.g., Pb and Sn); a metal of group IV–B (viz. Ti, Zr, Hf, and Th); and metals having an atomic number of from 23 to 30, inclusive.

Other salts, e.g., salts of alkali metals or alkaline earth metals, may be present in the salt solution employed in the invention so long as the hydrated polynuclear cations and the required acidic pH value are obtained under the conditions above described.

The salt employed should have a solubility in the water or in the polar organic solvent, e.g. lower alkyl alcohol or mixture thereof, of at least about 0.01 gram per 100 milliliters of liquid at 70° F.

The polar organic solvents which may be used include acetone, acetic acid, including glacial acetic acid, and lower alkyl acetates, e.g. ethyl acetate. Mixtures of water and polar organic liquids are preferred, particularly mixtures of water and lower alkyl alcohols, viz., methanol, ethanol, isopropyl and n-propyl alcohol. Some of the hydrous oxide-forming salts as described above, e.g., the halides, readily convert to the oxy form, e.g., the oxyhalide, upon exposure to moisture or contact with water. Such oxyhalides are quite acceptable for the practice of the invention. Zirconium oxyhalides usually employed as a hydrate, e.g., $ZrOCl_2 \cdot 8H_2O$ appears to possess certain properties which render it peculiarly adapted to the practice of the invention.

The theory which underlies the protection afforded argillaceous particles against plugging, when contacted by a selected salt solution according to the invention, is not fully understood. Although the invention is in no way to be limited to any theory of its operability, it appears to be due to the formation of a protective sheath firmly bonded to the exposed faces of the argillaceous particles so contacted. The sheath appears to be substantially inextricably attached to the particles and thereafter resists removal therefrom.

The amount of metal salt to employ is not critical. A number of factors enter into the decision of the amount thereof to employ on a given treating job. Among such factors are the estimated extent of clay or shale present in the stratum or strata being treated; the extent to which such clay or shale is exposed to the treating composition; and whether or not the formation is a particularly tight formation, i.e. of very low permeability or only moderately so. A suggested range of salt concentration to employ is between 0.01% and 20% by weight of the salt, based on the weight of water or organic liquid treating solution being employed. Usually between about 0.1% and 6.0% of salt, based on the weight of the salt solution, is satisfactory to treat a formation. The use of a concentration which is appreciably in excess of 20% by weight of solution usually does not show sufficient improvement over a lesser concentration to justify its use.

The salt solution required by the practice of the invention may be applied or injected by any known means including the usual pumping equipment used in well treatment.

One embodiment of the invention when treating subterranean argillaceous formations includes a pretreatment using an organic solvent, particularly one immiscible with water such as kerosene, toluene or the like, to clean up the well and preferably also includes a post treatment employing the same or another organic solvent, also preferably one that is water immiscible.

The practice of the invention may be better understood by the following examples and comparative experiments. Cores of Berea sandstone, which contain argillaceous material in varying amounts, were employed in the examples and comparative experiments. The procedure followed therein is set out below:

(1) A small core of a given size is oven-dried at 230° F. for at least 4 hours and air permeability measurements are conducted in accordance with the method of Klinkenberg to determine the natural permeability of the core to nonreacting fluids.

(2) The core is flushed with a 3% $CaCl_2$ solution under constant pressure until a constant flow rate therethrough is obtained.

(3) Enough distilled water is flushed through the core to insure removal of the 3% $CaCl_2$ solution and establish a constant flow rate at the test pressure. This permeability in millidarcys is known as $K_o$.

(4) The core is flushed with a measured volume of aqueous or polar organic solution containing the inorganic salt for the purpose of treating the argillaceous portion of the core.

(5) Distilled water is again forced through the core until a constant flow rate is obtained.

(6) A NaCl brine is then forced through the core.

(7) Distilled water is again forced through the core until a constant permeability in millidarcys is obtained. This value is known as $K_f$.

The ratio of $K_f$ over $K_o$ is a measure of any adverse change or damage to the permeability of the core. As indicated above, $K_o$ is the value obtained in Step 3; $K_f$ is the value obtained in Step 7. An arithmetical ratio value of 1.00 shows no formation damage at all. A value approaching 1.00 is desirable. However, a value of 0.1 or even as little as 0.05, represents an appreciable improvement and is a worthwhile attainment since without any additive in the solution to prevent clay or shale plugging, permeability of a core may easily fall to near zero after water has been forced thereinto.

The cores employed were generally about 2.60 to 2.65 centimeters in diameter and 2 to 3 centimeters long. The exact dimensions of each core were measured prior to its use in each test and those dimensions used in the calculations. They had a porosity of about 0.2 or 20% of the total core volume. Permeability values in millidarcys for all cores used in the examples and comparative tests were obtained by standard tests. The weight of salts employed refer to the weight of salt inclusive of water of crystallization where hydrates were used.

SERIES ONE

Each of the inorganic hydrous oxide-forming salts, set out in Table I below, was admixed in the water, brine, or alcohol indicated, and its effect on Berea sandstone core permeability ascertained according to the above series of steps. The amount of salt and the $K_f/K_o$ ratio are also shown in Table I.

TABLE I

| Salt | Solvent | Amount of Salt in Grams/Liter of Pore Volume of Core | $K_f/K_o$ |
| --- | --- | --- | --- |
| $Al(NO_3)_3 \cdot 9H_2O$ | Water | 76.6 | 0.531 |
| $Al(NO_3)_3 \cdot 9H_2O$ | Methanol | 13.8 | 0.609 |
| $CrCl_3 \cdot 6H_2O$ | Water | 368.0 | 0.260 |
| $HfOCl_2 \cdot 8H_2O$ | do | 35.7 | 0.912 |
| $InCl_3$ | do | 132.0 | 0.885 |
| $Fe(NO_3)_3$ | do | 20.8 | 0.647 |
| $Fe(NO_3)_3$ | Methanol | 28.2 | 0.709 |
| $FeCl_3$ | Water | 10.3 | 0.917 |
| $HgCl_2$ | do | 1,095.0 | 0.273 |
| $NiCl_2$ | do | 1,073.0 | 0.104 |
| $Pb(CH_3COO)_2$ | do | (1) | 0.845 |
| $Th(NO_3)_4$ | do | 38.2 | 0.992 |
| $Th(NO_3)_4$ | API brine [2] | 6.8 | 0.927 |
| $Th(NO_3)_4$ | 3% NaCl | 8.5 | 0.956 |
| $Th(NO_3)_4$ | 3% $CaCl_2$ | 14.4 | 0.952 |
| $Th(NO_3)_4$ | 1% Aq. HCl solution | 10.3 | 0.893 |
| $Th(NO_3)_4$ | Methanol | 71.7 | 0.923 |
| $SnCl_2$ | Water | 2,069.0 | 0.944 |
| $TiCl_3$ | do | 17.1 | 0.837 |
| $TiCl_3$ | 3% $CaCl_2$ brine | 46.7 | 0.919 |
| $ZnCl_2$ | Water | 33.8 | 0.104 |
| $ZrOCl_2 \cdot 8H_2O$ | do | 20.3 | 0.914 |
| $ZrOCl_2 \cdot 8H_2O$ | Methanol | 16.8 | 0.854 |
| $ZrOCl_2 \cdot 8H_2O$ | 30% $CaCl_2$ | 14.3 | 0.776 |
| $ZrOCl_2 \cdot 8H_2O$ | 3% NaCl | 26.7 | 0.838 |

[1] Not measured.
[2] A synthetic brine consisting essentially of 8% $CaCl_2$ and 2.5% NaCl by weight.

Reference to Table I shows that a marked improvement in the retention of original or natural permeability of the rock cores was made possible by treatment thereof with a solution containing a hydrous oxide-forming salt according to the invention.

SERIES TWO

These tests were conducted to show that salts, not encompassed by the invention, are unsatisfactory. The procedure followed was that outlined above and followed in Series One.

In Table II there are shown the salts and the amount thereof and the solvent employed in this series and the $K_f/K_o$ ratio.

TABLE II

| Salt | Solvent | Amount of Salt in Grams/Liter of Pore Volume of Core | $K_f/K_o$ |
| --- | --- | --- | --- |
| $SrCl_2$ | Water | 3,222.8 | 0.001816 |
| $BaCl_2$ | do | 268.9 | 0.002101 |
| | Methanol | | 0.001860 |
| $Ca(NO_3)_2 \cdot 4H_2O$ | do | 157.0 | 0.001190 |
| NaCl | Water | 3.0 | 0.001010 |
| KCl | do | 10.0 | 0.001000 |

Similar tests were conducted employing aqueous solutions of either the chloride or nitrate salt of each of Cs, Rb, Li, $NH_4$, Cd, Mg, Mn, and Ag. None of the salts so dissolved in water protected the clay or shale content of the cores against subsequent plugging when contacted with water. A number of the salts greatly damaged permeability; particularly, salts of K, Na, and $NH_4$ were found to be damaging in that permeability measured in Step 5 was substantially less than that measured in Steps 1 through 4.

The tests of Table II show that the alkali metal and alkaline earth metal salts, and the other salts therein set forth even though employed in very large amounts, are unsatisfactory for the practice of the invention.

SERIES THREE

The examples of Series One were repeated except that between Steps 3 and 4 the cores were flushed with the solvent which subsequently was used to dissolve the salt employed according to the invention.

TABLE III

| Salt | Solvent | Amount of Salt in Grams/Liter of Pore Volume of Core | $K_f/K_o$ |
|---|---|---|---|
| $ZrCl_4$ | Methanol | 77.1 | 0.806 |
| $ZrCl_4$ | Acetone | 70.5 | 0.246 |
| $ZrCl_4$ | Glacial acetic acid | 71.6 | 0.886 |
| $ZrCl_4$ | Isopropyl alcohol | 70.2 | 0.597 |
| $ZrCl_4$ | Ethyl alcohol | 70.8 | 0.879 |
| $ZrCl_4$ | Ethyl acetate | 70.2 | 0.516 |

Table III shows that satisfactory results may be obtained according to the practice of the invention employing polar organic solvents for the salt.

SERIES FOUR

The purpose of this series was to show the efficacy of solutions of zirconium oxychloride.

In Table IV is a summary of data obtained from a series of tests conducted on the same type and size Berea cores, according to the above procedure except that the test solution consisted of 2.0 grams of $ZrOCl_2 \cdot 8H_2O$ dissolved in 1000 ml. of distilled water.

TABLE IV

| Ml. of Treating Solution | Grams $ZrOCl_2 \cdot 8H_2O$ per Liter of pore Volume of Core | $K_f/K_o$ |
|---|---|---|
| 1.00 | 0.609 | 0.038 |
| 2.00 | 1.231 | 0.241 |
| 5.00 | 3.115 | 0.636 |
| 7.00 | 4.438 | 0.703 |
| 10.00 | 6.576 | 0.798 |
| 12.00 | 7.621 | 0.867 |
| 20.00 | 15.320 | 0.882 |
| 40.00 | 28.010 | 0.890 |

Reference to Table IV shows that zirconium oxychloride employed according to the invention results in a high $K_f/K_o$ ratio and accordingly offers excellent protection against plugging due to contacting the argillaceous material in the cores with water or aqueous solutions of alkali metal salts. A series of tests, such as those shown in Table IV, is useful in determining the optimum amount of chemical to use for treatment of a given body of argillaceous earthen formation. In this example, the optimum amount of $ZrOCl_2 \cdot 8H_2O$ to use appears to be about 10 grams per liter of core pore volume. Treatment with larger amounts of $ZrOCl_2 \cdot 8H_2O$ results in only slight increases in the $K_f/K_o$ ratio.

SERIES FIVE

The tests of Series Four were repeated except for the following changes: the amounts of $ZrOCl_2 \cdot 8H_2O$ employed and the solutions in which they were dissolved were: 1.6 grams thereof per liter of 3% by weight $CaCl_2$ brine; 1 gram thereof per liter of 3% by weight NaCl brine; 1.6 grams thereof per liter of API brine (i.e. an 8% $CaCl_2$: 2.5% NaCl brine); and 2 grams thereof per liter of a 30% by weight $CaCl_2$ brine. The milliliters of the respective brines containing the dissolved $ZrOCl_2 \cdot 8H_2O$ that passed through the test cores, the number of grams of salt per liter of pore volume of the cores employed, and the $K_f/K_o$ permeability ratio are shown in Table V.

TABLE V

| | Grams of Salt Per Liter of Pore Volume of Core | $K_t/K_o$ |
|---|---|---|
| Ml. of Solution, Consisting of 1.6 grams of $ZrOCl_2 \cdot 8H_2O$ per Liter of 3% $CaCl_2$ Brine, Passed through Core: | | |
| 10.00 | 5.573 | 0.538 |
| 15.00 | 8.653 | 0.739 |
| 20.00 | 12.038 | 0.784 |
| 25.00 | 13.051 | 0.897 |
| 30.00 | 17.787 | 0.976 |
| Ml. of Solution, Consisting of 1.0 gram of $ZrOCl_2 \cdot 8H_2O$ per Liter of 3% NaCl Brine, Passed through Core: | | |
| 10.00 | 5.626 | 0.186 |
| 15.00 | 7.896 | 0.724 |
| 20.00 | 11.862 | 0.650 |
| 25.00 | 14.240 | 0.828 |
| 30.00 | 17.955 | 0.918 |
| Ml. of Solution, Consisting of 1.6 Grams of $ZrOCl_2 \cdot 8H_2O$ per Liter of API Brine, Passed through Core: | | |
| 10.00 | 5.999 | 0.748 |
| 15.00 | 8.939 | 0.887 |
| 20.00 | 11.489 | 0.897 |
| 30.00 | 16.992 | 0.839 |
| Ml. of Solution, Consisting of 1.6 grams of $ZrOCl \cdot 8H_2O$ per Liter of 30% $CaCl_2$ Brine, Passed through Core: | | |
| 1.00 | 0.7344 | 0.00080 |
| 2.00 | 1.4796 | 0.00148 |
| 3.00 | 2.3550 | 0.01778 |
| 4.00 | 2.9211 | 0.03220 |
| 5.00 | 3.7461 | 0.08522 |
| 7.00 | 5.4842 | 0.16044 |
| 10.00 | 7.5633 | 0.57143 |
| 12.00 | 9.0950 | 0.58235 |
| 15.00 | 11.5550 | 0.74658 |
| 20.00 | 14.2890 | 0.77543 |
| 30.00 | 22.4760 | 0.74638 |
| 50.00 | 36.9290 | 0.78071 |

Series Five shows that the hydrous oxide-forming salt may be used effectively in the practice of the invention in the presence of common alkali metal salts or alkaline earth salts.

SERIES SIX

The tests of this series were conducted in the same manner as those of Series Four and Five except that lead acetate in water and stannous chloride in water were employed as the hydrous oxide-forming salts. The amounts and results are shown in Table VI.

TABLE VI

| Ml. of Treating Solution | Grams of Salt Per Liter of Solution | Grams of Salt Per Liter of Pore Volume of Core | $K_f/K_o$ |
|---|---|---|---|
| 200 | 30 of $Pb(CH_3COO)_2 \cdot 3H_2O$ | 2,069.2 | 0.854 |
| 200 | 30 of $SnCl_2 \cdot 2H_2O$ | 2,069.2 | 0.952 |

Highly satisfactory results are observed to be attained by the use of the lead or tin salt according to the invention.

SERIES SEVEN

This series of tests were conducted on the same size and porosity Berea sandstone cores as above, following the above outlined steps but employing a solution of $CrCl_3 \cdot 6H_2O$ as the treating composition according to the invention.

The results of this series of tests are presented in Table VII. The test solution consisted of 1.0 grams of $CrCl_3 \cdot 6H_2O$ in 1000 ml. of distilled water.

TABLE VII

| | Grams of $CrCl_3 \cdot 6H_2O$ Per Liter of Pore Volume of Core | $K_f/K_o$ |
|---|---|---|
| Ml. of Test Solution: | | |
| 5.04 | 1.706 | 0.011 |
| 7.04 | 2.401 | 0.080 |
| 10.02 | 3.367 | 0.689 |
| 12.00 | 4.154 | 0.536 |
| 15.06 | 5.044 | 0.788 |
| 20.02 | 6.753 | 0.856 |

Table VII shows that as soon as sufficient salt therein used had been brought into contact with the components of the core, there was no significant loss in permeability.

SERIES EIGHT

This series was run to show the efficacy of thorium salts in the practice of the invention. $Th(NO_3)_4 \cdot 4H_2O$ was dissolved in 1000 ml. of distilled water in an amount sufficient to provide 2 grams of $Th(NO_3)_4 \cdot 4H_2O$. Test cores employed were Berea sandstone of the type, size, and porosity employed in the previous examples.

TABLE VIII

| Ml. of Solution | Salt Solution Used | Grams of Salt Per Liter of Pore Volume of Core | $Ki/Ko$ |
| --- | --- | --- | --- |
| 1.00 | 2 gm. $Th(NO_3)_4 \cdot 4H_2O$ to 1,000 ml. with distilled $H_2O$ | 0.7314 | 0.02129 |
| 2.00 | do | 1.4574 | 0.02889 |
| 5.00 | do | 3.5987 | 0.65556 |
| 7.00 | do | 4.7022 | 0.82028 |
| 10.00 | do | 7.4196 | 0.83704 |
| 12.00 | do | 8.1444 | 0.88571 |
| 15.00 | do | 10.9550 | 0.93421 |
| 20.00 | do | 13.8620 | 0.96154 |
| 50.00 | do | 34.6140 | 0.93651 |

The results shown in Table VIII are conclusive that the thorium is effective in the practice of the invention when a sufficient amount of a convenient solution, e.g. about a 0.2% solution, is provided.

TEST NINE

The method of the invention, when applied to treatment of exposed clay- or shale-containing strata at the surface of the earth, such as a roadway or the like, may be carried out as follows:

A solution of one of the selected salts encompassed in the description hereof is admixed with water or a suitable polar organic liquid and is thereafter sprayed over the earthen surface, usually in sufficient quantity to penetrate through the surface to at least an inch and preferably six inches to a foot or more below the surface. The clay will thereafter resist being plugged when wet by ground or surface waters and will retain its permeability.

TEST TEN

The method of the invention when applied to the treatment of subterranean clay- or shale-containing strata, traversed by a wellbore, may be carried out, in a broad sense, as follows:

Pumping equipment including pumps, mixing tanks, and connecting lines leading to the wellbore are brought onto location and set up according to known procedures. The solution of selected hydrous oxide-forming salt is dissolved in water, a suitable organic solvent, or mixture thereof, pumped down the wellbore to the level of the strata to be treated, and forced into the strata to a sufficient depth to contact faces of the particles comprising the strata which will subsequently be contacted by water, alkali metal salt brines, or alkaline earth metal salt brines. Thereafter, water or such brines may be brought into contact with the so treated strata which will resist plugging as a result thereof.

The following treatment illustrates this embodiment of the invention.

A well penetrating the Olmos formation in Medina County, Texas, comprising a 17 foot thick oil-producing stratum containing objectionable argillaceous material was to be employed for steam injection. The oil being produced was of a low API gravity. Due to the presence of the argillaceous material, it was deemed highly desirable to condition this stratum against plugging by the effect of steam and resulting water. This formation penetrated by other wells, had heretofore refused to accept more than about 2 to 5 barrels of water before further injection was impossible without fracturing the formation. Fracturing the formation in association with steam injection was undesirable.

Sufficient of each of the following were brought on location to provide:

1680 gallons of toluene, 3400 gallons of methanol containing admixed therewith 800 pounds of $ZrOCl_2 \cdot 8H_2O$, 1600 gallons of filtered kerosene, and 1600 gallons of fresh water.

After making the proper hook-up of pumpers and lines for injection of fluids down the well, the well was treated as follows: The 1680 gallons of toluene were pumped down the well for the purpose of cleaning out the well since it had been producing a viscous low API gravity crude oil. The methanol, containing dissolved therein the $ZrOCl_2 \cdot 8H_2O$, was then injected, followed by the injection of the 1600 gallons of kerosene which displaced the salt solution back into the formation. This concluded treatment. All injection pressures were less than the fracturing pressure of the formation. The rate of injection throughout treatment was about 10 gallons per minute.

Following treatment, 38 barrels (1596 gallons) of water were pumped down the well and forced back into the formation, at less than fracturing pressure, thereby demonstrating the highly satisfactory effect of the treatment of the invention to inhibit plugging when the formation is subsequently contacted with water.

The above example is illustrative only of a practice of the invention involving a well producing a low API gravity crude. The inclusion of either or both pretreatment with toluene and/or posttreatment with kerosene are but preferred practices of the invention under the conditions there encountered.

Having described our invention, what we claim and desire to protect by Letters Patent is:

1. The method of conditioning an earthen formation, including both surface and subsurface strata, which is composed at least in part of argillaceous material, to prevent the blockage of fluid flow through said formation when subsequently contacted with water or alkali metal brines which comprises: contacting at least a portion of said argillaceous material with an effective amount of a salt of a hydrous oxide-forming metal dissolved in a carrier liquid, selected from the class consisting of water, brines, acids, polar organic liquids, and mixtures thereof, said salt having a solubility and being present in an amount of at least 0.01 percent by weight of said carrier liquid.

2. The method according to claim 1 wherein said salt is selected from the class consisting of halides, oxyhalides, sulfates, sulfites, nitrites, phosphates, phosphites, haloacetates, acetates, nitrates and formates of metals selected from the class consisting of Al, Co, Cr, Cu, Fe, Ga, Hf, Hg, In, La, Ni, Pb, Sc, Sn, Th, Ti, Tl, Y, Zn, and Zr.

3. The method according to claim 1 wherein said salt is a $ZrOCl_2$ hydrate.

4. The method according to claim 1 wherein the amount of said salt is between 0.01% and 20% by weight, based on the weight of carrier liquid being employed.

5. The method according to claim 1 wherein the liquid carrier is water.

6. The method according to claim 1 wherein said liquid carrier is a brine of a salt selected from alkali metal salts and alkaline earth metal salts and mixtures, thereof.

7. The method according to claim 1 wherein said liquid carrier is a polar organic solvent.

8. The method according to claim 7 wherein said polar organic solvent is selected from the class consisting of $C_1$ to $C_3$ aliphatic monoalcohols, acetone, ethyl acetate, acetic acid, and mixtures thereof.

9. The method according to claim 8 wherein said polar organic solvent is a $C_1$ to $C_3$ aliphatic monoalcohol.

10. The method according to claim 1 wherein said liquid carrier is a mixture of $C_1$ to $C_3$ aliphatic monoalcohol and water.

11. The method according to claim 10 wherein said salt is first dissolved in a $C_1$ to $C_3$ aliphatic monoalcohol and thereafter the resulting solution admixed with water.

12. The method according to claim 1 wherein the formation is treated prior to injection of said carrier liquid containing the salt with an organic solvent.

13. The method according to claim 1 wherein the injection of said carrier liquid containing the salt is followed by an injection of an organic solvent.

References Cited

UNITED STATES PATENTS

| | | | |
|---|---|---|---|
| 2,761,838 | 9/1956 | Brown et al. | 252—8.55 |
| 2,841,222 | 7/1958 | Smith | 166—42 |
| 2,947,360 | 8/1960 | Bernard | 166—42 X |
| 3,036,630 | 5/1962 | Bernard et al. | 166—42 X |
| 3,123,139 | 3/1964 | Conley et al. | 166—42 |
| 3,131,759 | 5/1964 | Slusser et al. | |
| 3,141,501 | 7/1964 | Bernard et al. | 166—42 X |
| 3,191,676 | 6/1965 | Froning | 166—9 |
| 3,258,072 | 6/1966 | Froning | 166—42 X |

STEPHEN J. NOVOSAD, *Primary Examiner.*